No. 877,109. PATENTED JAN. 21, 1908.
O. F. McCRARY.
CAN OPENER.
APPLICATION FILED JUNE 5, 1907.
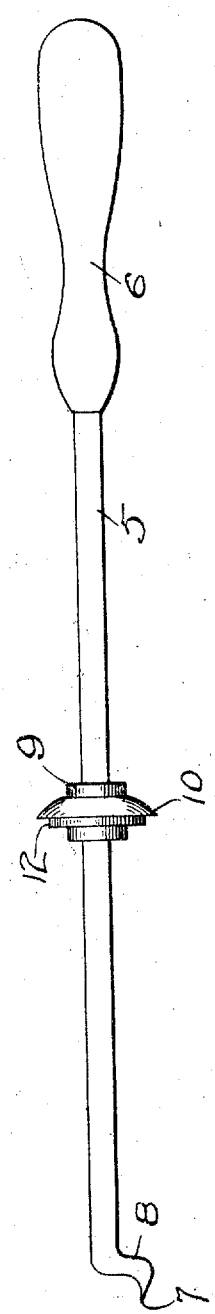
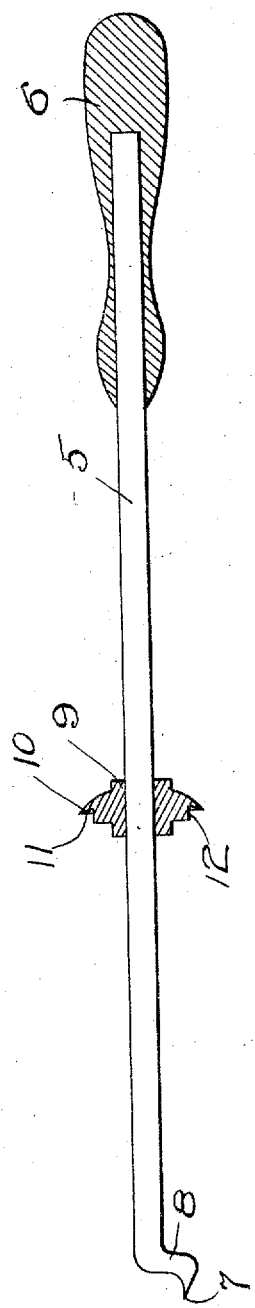
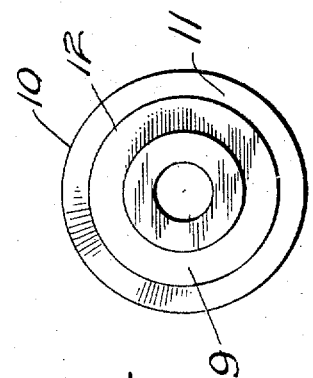
Witnesses
Jesse C. Miller
F. G. Smith
Inventor
Otis F. McCrary
By Chandler & Chandler
Attorneys

UNITED STATES PATENT OFFICE.

OTIS FRED McCRARY, OF HENDERSONVILLE, NORTH CAROLINA.

CAN-OPENER.

No. 877,109.

Specification of Letters Patent.

Patented Jan. 21, 1908.

Application filed June 5, 1907. Serial No. 377,461.

*To all whom it may concern:*

Be it known that I, OTIS FRED MCCRARY, a citizen of the United States, residing at Hendersonville, in the county of Henderson, State of North Carolina, have invented certain new and useful Improvements in Can-Openers; and I do hereby declare the following to be a full, clear, and exact description of the invention, such as will enable others skilled in the art to which it appertains to make and use the same.

This invention relates to can openers and has for its object to provide a simple device of this character which is applicable for use on any size of can and which will yet not require any fixed adjustment.

Broadly stated the invention resides in the provision of a shank having a handle and having its free end bent and sharpened for insertion through the can top at the center thereof, and a cutting disk which is freely slidable upon the shank but is of such construction that during the process of cutting, it will not deviate from a circular path.

The novelty in my device resides in the specific form of the cutting disk, this disk being so constructed, as stated above, that when it cuts into the top of the can, it will be guided in a circle and being also shouldered to limit the depth of the cut.

In the accompanying drawings, Figure 1 is a side elevation of the device, Fig. 2 is a detail longitudinal sectional view through a portion thereof showing the manner in which the cutting disk is mounted upon the shank of the device, and, Fig. 3 is a front elevation of the cutting disk removed from the shank.

As shown in the drawings, the device comprises a shank 5 provided at one of its ends with a handle 6 and having its other end sharpened to a point 7 and bent to substantially L-shape as indicated at 8, it being understood that this end of the shank is to be forced into the top of the can at the center thereof and serves as a pivot upon which the device may be turned for a purpose to be presently made apparent.

A sleeve 9 is loosely slidable upon the shank 5 and formed upon the sleeve substantially at the middle thereof is a cutting disk 10 which has a convex side and at its edge has its other face or side concaved as indicated at 11. In other words the disk has a concavo-convex cutting edge and it is owing to the nature of this cutting edge that the disk is guided in a circle during the cutting operation, the disk having its concaved face presented in the direction of the pointed end of the shank. Formed integral with the sleeve and with the concaved face of the cutting disk is an annular shoulder 12 which, when the tool is in use, travels upon the upper face of the can top and limits the degree to which the cutting edge of the disk enters the can. It will be understood of course that the disk, the sleeve, and the shoulder are formed integral and that the edge of the disk is sharpened.

What is claimed is—

A device of the class described comprising a shank, a handle arranged at one end of the shank, the other end of the shank being sharpened and bent for engagement in a can top, a sleeve freely slidable upon said shank, a disk formed integral with the sleeve at the middle thereof, said disk being substantially concavo-convexed and having a sharpened peripheral cutting edge, and an annular shoulder formed integral with the sleeve and with the concave face of the disk whereby the depth of cut may be regulated, the shoulder being designed to travel over the upper face of the can top being cut.

In testimony whereof, I affix my signature, in presence of two witnesses.

O. FRED McCRARY.

Witnesses:
C. W. BROWN,
E. C. INGRAM.